United States Patent [19]
Ball

[11] Patent Number: 5,924,945
[45] Date of Patent: *Jul. 20, 1999

[54] SPROCKET WITH INDENTATIONS FORMING HYDRODYNAMIC BEARINGS

[75] Inventor: Harvey Stan Ball, Milan, Tenn.

[73] Assignee: Sandvik AB, Sandviken, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/759,158

[22] Filed: Dec. 3, 1996

[51] Int. Cl.⁶ .......................... F16H 55/56; F16H 57/04; B23D 57/02
[52] U.S. Cl. .................................. 474/45; 474/91; 30/384
[58] Field of Search ................................ 474/45, 91, 152, 474/202; 30/383, 384, 385, 386, 387

[56] References Cited

U.S. PATENT DOCUMENTS

| | | | |
|---|---|---|---|
| 449,166 | 3/1891 | McCray | 474/202 |
| 3,044,506 | 7/1962 | Oehrli . | |
| 3,279,508 | 10/1966 | Ehlen et al. . | |
| 4,048,863 | 9/1977 | Pemberton | 474/91 |
| 4,321,750 | 3/1982 | Sugihara | 424/91 |
| 4,414,876 | 11/1983 | Loigerot . | |
| 4,559,028 | 12/1985 | Reeves, Jr. | 474/152 |
| 4,589,860 | 5/1986 | Brandenstein et al. | 474/152 |
| 4,593,591 | 6/1986 | Beerens . | |
| 4,813,916 | 3/1989 | Valin | 474/152 |
| 5,092,044 | 3/1992 | Edgerton et al. . | |
| 5,556,111 | 9/1996 | Sedy . | |

FOREIGN PATENT DOCUMENTS

| | | |
|---|---|---|
| 80 266/82 | 8/1983 | Australia . |
| 87899 | 6/1992 | Finland . |
| 211732 | 3/1967 | Sweden . |

OTHER PUBLICATIONS

Derwent's Abstract No. 94–80852/10, Abstract of RU 2002607, Nov. 15, 1993.

*Primary Examiner*—Charles A. Marmor
*Assistant Examiner*—Matthew A. Kaness
*Attorney, Agent, or Firm*—Burns, Doane, Swecker & Mathis, L.L.P.

[57] ABSTRACT

A nose sprocket for a chain saw guide bar, where the bottom part of the teeth or the outermost part of the central region or both have indentations with softly inclined trailing edges, acting as hydrodynamical bearings to keep the sprocket centered between the side plates of the guide bar.

20 Claims, 1 Drawing Sheet

SPROCKET WITH INDENTATIONS FORMING HYDRODYNAMIC BEARINGS

BACKGROUND OF THE INVENTION

1 Field of the Invention

The present invention relates to a chain saw cutting tool and, in particular, to a non-driving guide pulley or sprocket on a chain saw cutting tool.

2 Description of Related Art

Chain saw guide bars are commonly provided with a thin nose sprocket for carrying the saw chain around the nose of the guide bar. The nose sprocket is inserted between two side plates of the laminated or solid guide bar and has a roller bearing to carry the loads from chain tension and cutting. Lateral forces are usually small, and leakage of chain lubricating oil onto the sprocket sides is usually enough to avoid friction problems on the sprocket sides.

In severe service such as in tree harvester machines, however, the nose sprocket runs very fast and with higher loads. It is common that the sprocket becomes slightly deformed from overheating, which causes it to rub against the side plates of the guide bar. This rubbing may lead to excessive wear, fretting or seizure.

It has been previously suggested that lubricating oil should be supplied to the central region of the sprocket through channels such as disclosed in U.S. Pat. No. 3,044,506 and 3,279,508, or that the sprocket should be made with spiral grooves to catch and convey chain oil from the chain groove towards the sprocket center such as disclosed in U.S. Pat. No. 5,092,044. None of these solutions works well if the area of the sprocket being rubbed is at the lowest part of the sprocket teeth, which is very common.

SUMMARY OF THE INVENTION

According to the present invention a sprocket is made with controlled depth profile indentations at the lowest parts of the teeth or in the adjoining region. The indentations should be such that they act as self-pressurizing bearings when they catch oil which has been carried along by the chain drive links. This keeps the sprocket from rubbing against the side plates in this critical region.

Specifically, a nose sprocket for a chain saw guide bar in accordance with the present invention includes two flat parallel sides with sprocket teeth extending from a central region. Indentations on the two flat parallel sides are located in an area at bottom part of the sprocket teeth and an outermost part of the central region. The indentations have a softly inclined trailing edge, and can include a softly inclined leading edge relative to a normal sprocket rotating direction. The outline of the indentations can be circular or polygonal.

BRIEF DESCRIPTION OF THE DRAWINGS

The present invention will now be described by way of exemplary embodiments with reference to the accompanying drawing figures in which.

DESCRIPTION OF EXEMPLARY EMBODIMENTS

Figure 1:
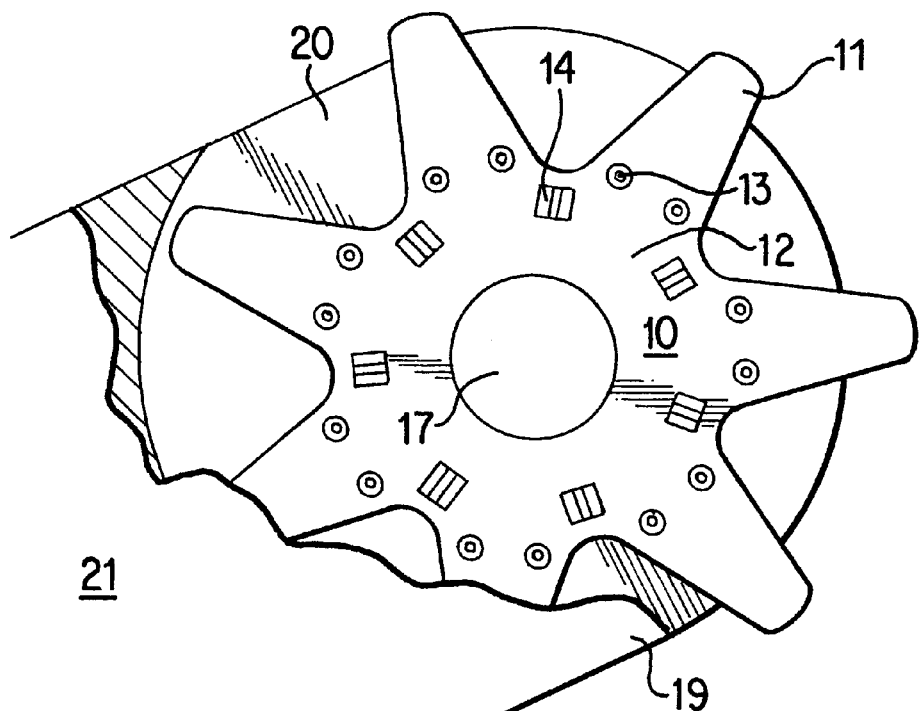
FIG. 1 is a partial cut-away illustration of a nose of a chain saw showing a nose sprocket with indentations in accordance with the present invention.
Figure 2:
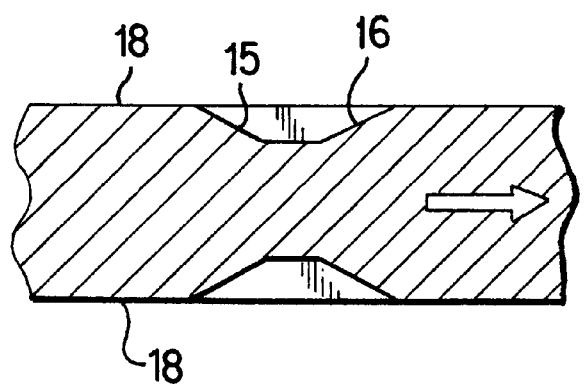
FIG. 2 is a cross-sectional profile view of one of the indentations in accordance with the present invention.

With reference to FIGS. 1 and 2, a sprocket 10 according to the invention includes at least one controlled depth profile indentations at the lower half of the teeth or in the outermost half of the central region adjoining the teeth. The sprocket 10 is inserted between two side plates 19 and 20 at the nose end of a guide bar 21 and supported by a roller bearing (not shown) at the sprocket center.

The sprocket 10 is a metal piece having two flat parallel sides 18, with teeth 11 radially extending from a central region 12 and with a cylindrical hole 17 for receiving a roller bearing. The central region 12 extends from the cylindrical hole 17 to the bottom of gullets between the teeth 11. The areas most prone to friction and rubbing against the side plates 19 and 20 of the guide bar 21 are the bottom parts of the teeth 11 closest to the central region 12 and the outermost parts of the central region 12. This is the caused by thermal buckling of the central region 12 if the bearing is overheated, and will be further aggravated by heat generated by the friction. The tips of the teeth 11 are cooler since part of the time during operation they extend out from between the side plates, and since they are flexible enough that they do not typically rub hard against the side plates 19 and 20.

Although lubricating oil is deposited by the saw chain on the flanks of the sprocket teeth 11 and may flow toward the flat sides 18 of the sprocket 10, the curvature of the gullet between the teeth 11 has a tendency to catch most of that oil and throw it radially outward. According to the invention, the flat sides 18 of the sprocket are made with indentations 13, 14 which both catch and hold the oil which has flowed near the central region 12 at the bottom part of the teeth 11 in circular indentations 13 and the outermost part of the central region 12 in polygonal (e.g., quadrilateral) indentations 14, and utilize that oil as in a self-pressurizing liquid bearing. The pressure built up in each indentation is strongly dependent on how close the sprocket side is to the guide bar side plate.

The indentations 13, 14 can be located symmetrically on both sides 18 of the sprocket 10 as shown in FIG. 2, and equilibrium between bearing pressures will then keep the sprocket centered between the side plates without rubbing either side. The indentations 13, 14 should be radially located in the innermost half of the sprocket teeth and/or in the outermost half of the central portion 12 of the sprocket 10 for maximum benefit.

As shown in FIG. 2, a suitable shape for an indentation may be round 13 or quadrilateral 14, in either case with a softly inclined ramp 15 at least at the trailing edge as the sprocket 10 rotates in the normal working direction shown by an arrow. For a reversible guide bar (e.g., a bar that can be flipped over so as to use both edges as the primary cutting edge to maximize bar life), the indentations should be symmetrical with leading 16 and trailing 15 edges softly inclined. For a quadrilateral indentation 14 the inner and outer edges are preferably steep, e.g., 5° to 45° relative to the plane of the sprocket 10.

The indentations 13, 14 can be made by various methods, such as milling, coining, drilling or spark erosion. They may be located singly or in groups, but should be equal for each sprocket tooth 11.

It will be apparent to those skilled in the art that modifications may be made to the preferred embodiment without departing from the true spirit and scope of the invention. For example, while the preferred embodiment is illustrated and described as having flat faced indentations of either circular or quadrilateral outlines, the indentations may have other outlines and cross-sections. Also, the indentations are shown near the bottom of the gullets between the sprocket teeth, but may be placed elsewhere where friction would be reduced.

For instance, the indentations may be wholly inside the central portion 12, wholly outside the central portion 12 or in the border between the central portion and the sprocket tooth 11. Also, the indentations may be partially exposed at the edge of the contour of the sprocket 10. In an embodiment were the indentations are partially exposed at the contour edge, the indentations holding more lubricant would be at the leading edges of the sprocket 10 in its rotation. If the sprocket 10 is to be driven in either direction, then it would be preferred that the partially exposed indentations appear on both leading and trailing edges. A combination of these locations can be employed as well. Further, though disclosed for use with tree harvesting machines, the invention can be used a conventional wood cutting saws. Accordingly, the invention encompasses chain saws in general in accordance with the definition of the claims appended hereto.

I claim:

1. A nose sprocket for a chain saw guide bar, comprising:

two flat parallel side;

sprocket teeth extending from a central region; and indentations on said two flat parallel sides in an area located at a bottom part of the sprocket teeth and a radially outermost part of the central region of the parallel sides, said indentations defining closed, self-contained areas for gathering oil and utilizing the oil for lubrication between said nose sprocket and contact surface of the guide bar, said indentation thus forming self-pressurized liquid bearings.

2. A nose sprocket according to claim 1, wherein said indentations have an inclined trailing edge relative to a sprocket rotating direction.

3. A nose sprocket according to claim 2, wherein at least two of said indentations have a circular configuration.

4. A nose sprocket according to claim 2, wherein at least two of said indentations have a quadrilateral configuration.

5. A nose sprocket according to claim 2, wherein said indentations on one of said flat parallel sides of said sprocket are located symmetrically with said indentations on the other of said flat parallel sides of said sprocket.

6. A nose sprocket according to claim 1, wherein said indentations having inclined leading and trailing edges.

7. A nose sprocket according to claim 6, wherein at least two of said indentations have a circular configuration.

8. A nose sprocket according to claim 6, wherein at least two of said indentations have a quadrilateral configuration.

9. A nose sprocket according to claim 6, wherein said indentations on one of said flat parallel sides of said sprocket are located symmetrically with said indentation on the other of said flat parallel sides of said sprocket.

10. A nose sprocket according to claim 1, wherein at least two of said indentations have a circular configuration.

11. A nose sprocket according to claim 10, wherein at least two of said indentations have a quadrilateral configuration.

12. A nose sprocket according to claim 1, wherein at least two of said indentations have a quadrilateral configuration.

13. A nose sprocket according to claim 1, wherein said indentations on one of said flat parallel sides of said sprocket are located symmetrically with said indentations on the other of said flat parallel sides of said sprocket.

14. A nose sprocket according to claim 1, wherein said indentations are shallow, dimple-shaped indentations.

15. A nose sprocket according to claim 1, wherein said indentations are shallow, quadrilateral indentations.

16. A nose sprocket according to claim 1, wherein said indentations define hydrodynamic bearings.

17. A nose sprocket for a chain saw guide bar, comprising:

two flat parallel sides;

sprocket teeth extending from a central region of the parallel sides; and bearing means on said two flat parallel sides in an area located at a bottom part of the sprocket teeth and radially outermost part of the central region of the parallel sides for holding oil and providing lubrication between said nose sprocket and contact surface.

18. A nose sprocket according to claim 17, wherein said hydrodynamic bearing means comprise indentations on said two flat parallel sides.

19. A nose sprocket according to claim 17, wherein said hydrodynamic bearing means comprise shallow, dimple-shaped indentations on said two flat parallel sides.

20. A nose sprocket according to claim 17, wherein said hydrodynamic bearing means comprise shallow, quadrilateral indentations on said two flat parallel sides.

* * * * *